United States Patent
Noga et al.

[11] Patent Number: 6,112,901
[45] Date of Patent: Sep. 5, 2000

[54] HOLDING CASE CAPABLE OF HOLDING IC CARD CERTAINLY

[75] Inventors: Takehiro Noga; Kinji Atsumi; Yoshihiro Yamamura; Munetaka Sasaki; Tomohiro Morikawa, all of Tokyo, Japan

[73] Assignee: NEC Corporation, Tokyo, Japan

[21] Appl. No.: 09/343,712

[22] Filed: Jun. 30, 1999

[30] Foreign Application Priority Data

Jun. 30, 1999 [JP] Japan .................................. 10-183991

[51] Int. Cl.[7] .................................................. B65D 85/30
[52] U.S. Cl. ........................................ 206/723; 206/449
[58] Field of Search ................................. 206/722–724, 206/307, 308.1, 308.3, 232, 449

[56] References Cited

U.S. PATENT DOCUMENTS

| 4,860,897 | 8/1989 | Fowler et al. | 206/308.1 |
|---|---|---|---|
| 5,267,647 | 12/1993 | Stumpff et al. | 206/308.1 |
| 5,375,710 | 12/1994 | Hayakawa et al. | 206/724 |
| 5,495,940 | 3/1996 | Taniyama | 206/308.1 |
| 5,638,952 | 6/1997 | Kim | 206/308.1 |

FOREIGN PATENT DOCUMENTS

| 2-16768 | 2/1990 | Japan . |
|---|---|---|
| 3-15393 | 2/1991 | Japan . |
| 7-125785 | 5/1995 | Japan . |
| 9-221186 | 8/1997 | Japan . |
| 10-24982 | 1/1998 | Japan . |

*Primary Examiner*—Paul T. Sewell
*Assistant Examiner*—Luan K. Bui
*Attorney, Agent, or Firm*—Foley & Lardner

[57] ABSTRACT

A holding case has an intermediate packing member for only a card-type object. The intermediate packing member has a cavity for receiving the card-type object and holding mechanism for holding the card-type object. The holding mechanism has first and second claws which projects into the cavity. The second claw formed on a beam which is formed by forming a slit beside a base of the second claw. The beam bends in response to external force supplied from the outside, consequently projecting degree of the second claw into said cavity changes in response to the external force. An external casing member is based on ISO standards for a CD case.

5 Claims, 6 Drawing Sheets

HOLDING CASE CAPABLE OF HOLDING IC CARD CERTAINLY

BACKGROUND OF THE INVENTION

This invention relates to a holding case for holding a card-type object, particularly, relates to a holding case having an intermediate packing member for only an IC card.

Various conventional holding cases are proposed in the past to hold a card-type object, such as an IC card based on PCMIA (Personal Computer Memory Card International Association) standards. These conventional holding cases are similar in structure to one another. That is, each of the conventional holding cases has an external casing member and an intermediate packing member which is received in the external casing member and which holds the card-type object.

Though the intermediate packing member has a holding structure for holding the card-type object, the holding structure lacks durability and certainty or reliability.

SUMMARY OF THE INVENTION

It is therefore an object of this invention to provide a holding case which is capable of holding a card-type object certainly.

It is another object of this invention to provide a holding case which is capable of holding and releasing a card-type object easily and reliably.

It is still another object of this invention to provide a holding case which is reliable and durable.

Other object of this invention will become clear as the description proceeds.

On describing the gist of this invention, it is possible to understand that a holding case is used for holding a card-type object.

According to the gist of this invention, the holding case comprises an external casing member which is standardized by ISO for a CD case. An intermediate packing member is received by the external casing member and has holding mechanism which is capable of holding/releasing the card-type object easily and certainly.

The holding mechanism has a cavity to receive the card-type object and comprises first and second claws which project into the cavity and hold the card-type object received by the cavity. A beam is formed by forming a slit beside a base of the second claw to change projecting degree of the second claw into the cavity.

DESCRIPTION OF THE PREFERRED EMBODIMENT

Figure 1:
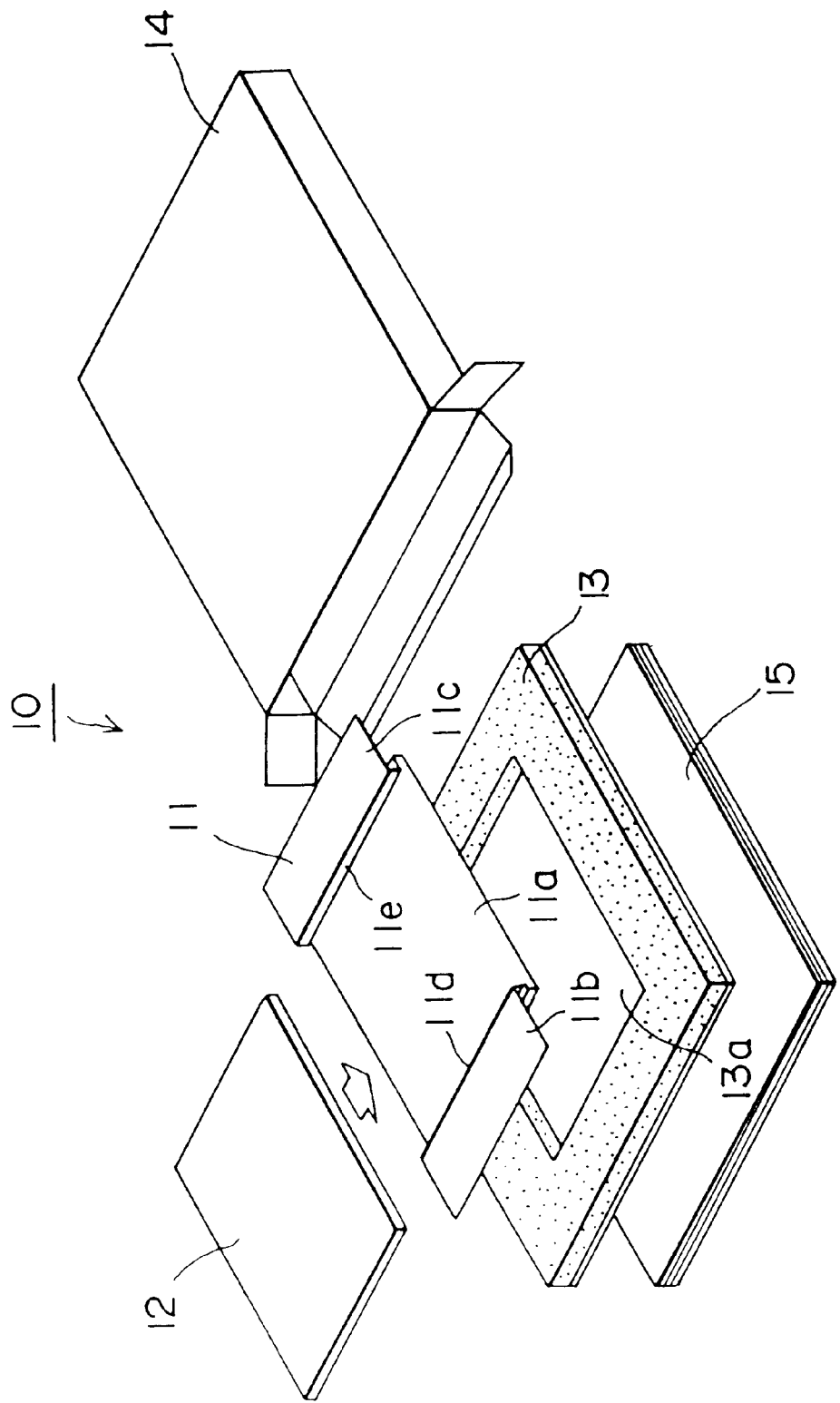
FIG. 1 shows an exploded perspective view of a conventional holding case.

Referring to FIG. 1, description will be at first directed to a conventional holding case for a better understanding of this invention.

In FIG. 1, the conventional holding case 10 comprised a holding member 11 to hold a card-type object 12, such as a pocket calculator, an IC card, and so on. The holding member 11 is made of plastic and has a main board 11a, side boards 11b and 11c, and folded sections 11d and 11e which connects the side boards 11b and 11c with the main board 11a, respectively. The folded sections 11d and 11e form grooves for receiving side edges of the card-type object 12. A spacer 13 is made of plastic foam and has an opening 13a for receiving the card-type object 12 held by the main board 11a. A package 14 is made of paper or cardboard and receives the holding member 11, the card-type object 12, the spacer 13, and an instruction manual 15 for the card-type object 12.

When the package 14 receives the holding member 11, the spacer 13 and the instruction manual 15, the spacer 13 presses the side boards 11b and 11c against an inner surface of the package 14. Consequently, the holding member 11, the spacer 13 and the package 14 restrains the card-type object 12 from moving.

Therefore, the holding case 10 can certainly hold the card-type object 12. However, it is troublesome to make the holding case 10 hold and release the card-type object 12. Moreover, the holding case lacks durability, because the package 14 can not withstand moisture. Furthermore, the holding case 10 is too small to receive the instruction manual 15 without folding it. Such a holding case is disclosed in Japanese Unexamined Utility Model Publication No. Hei 2-16768.

Figure 2:
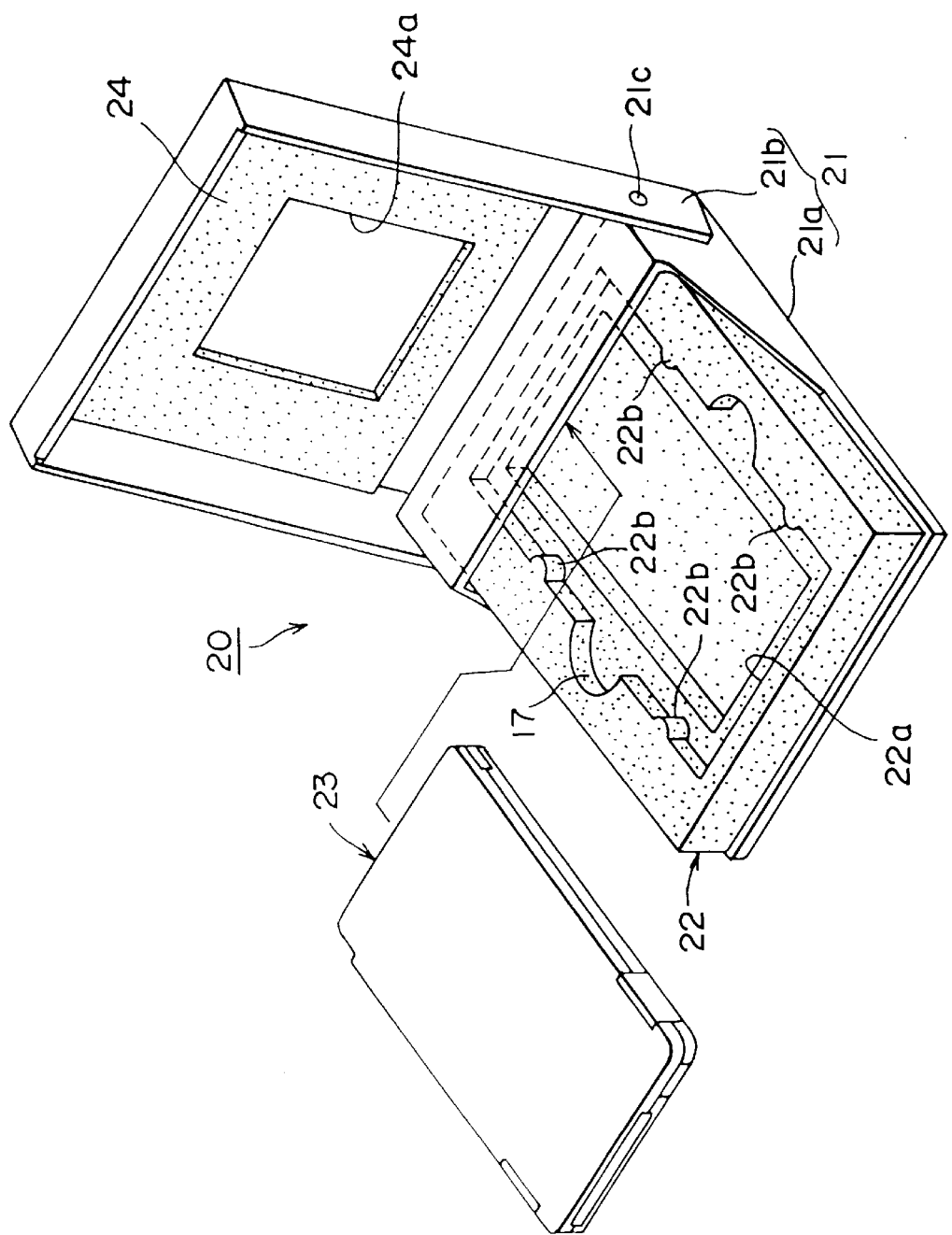
FIG. 2 shows a perspective view of another conventional holding case.

In FIG. 2, another conventional holding case 20 comprises a external casing member 21 which has a plastic container 21a and a plastic lid 21b. The plastic container 21a has a pair of pivots 21c on its side surfaces. The plastic lid 21b has a pair of holes, which receive the pivots 21c, and turns on the pivots 21c. An intermediate packing member 22 is made of conductive urethane foam and is located in the plastic container 21a. The intermediate packing member 22 has a cavity 22a for receiving a PC card 23 based on the PCMCIA or JEIDA (Japanese Electronic Industry Development Association) standards. The intermediate packing member 22 further has projections 22b to hold the PC card 23 received in the cavity 22a. Conductive coil springs or leaf springs with conductive cap members may be used instead of projections 22b. A covering member 24 with a window 24a is similar in material to the intermediate packing member 22 and is fixed on an inner surface of the lid 21b.

When the PC card 23 inserted in the cavity 22a, it is held by elastic force of the projections 22b. However, the holding case lacks stability of holding the PC card 23 because the elastic force is weak and the urethane foam may be easily deformed. In addition, the holding case has a fault in that it has no space for an instruction manual and a letter of guarantee. Such a holding case is disclosed in Japanese Unexamined Japanese Patent Publication No. Tokkaihei 10-24982.

Figure 3:
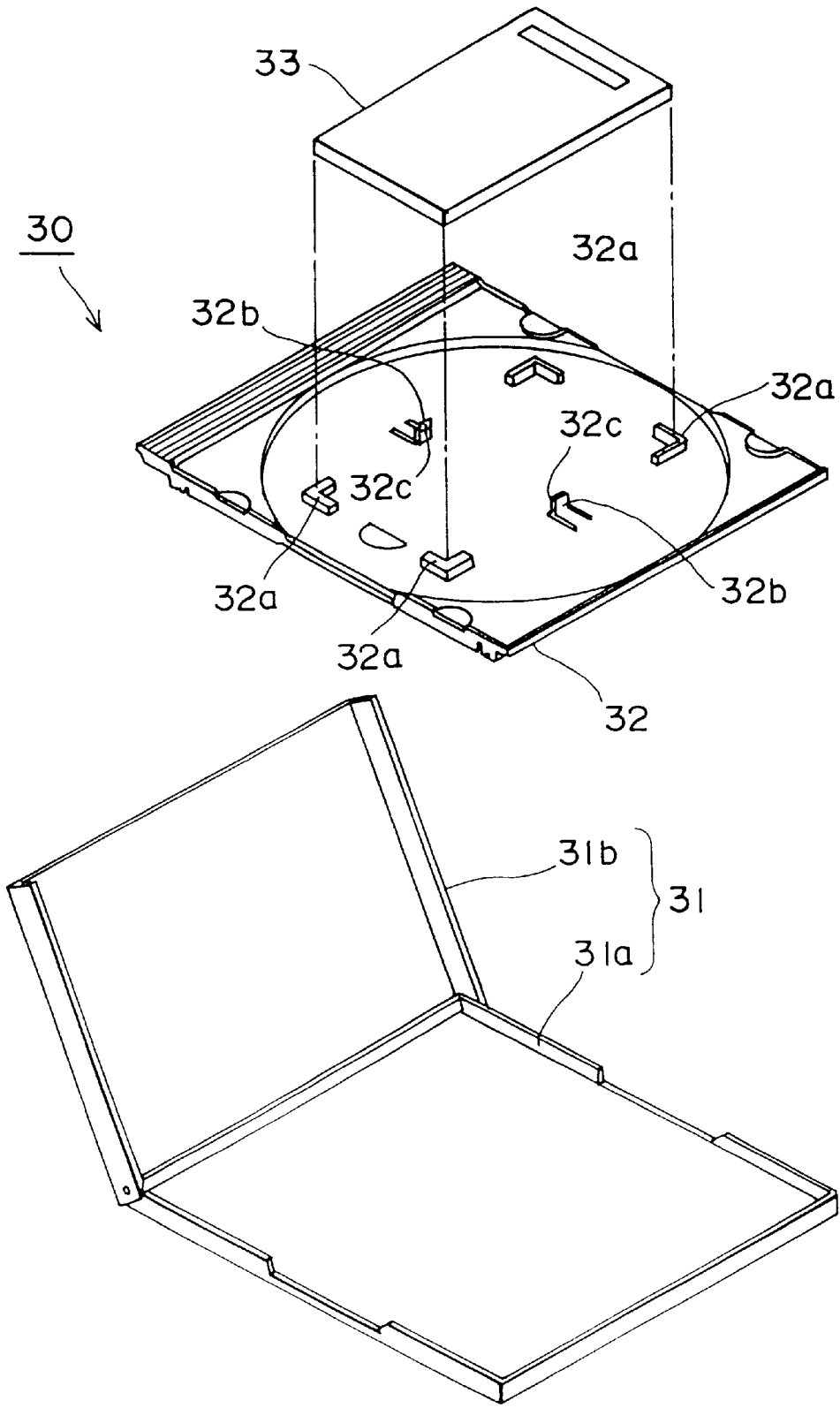
FIG. 3 shows an exploded perspective view of still another conventional holding case.

In FIG. 3, still another conventional holding case 30 comprises an external casing member 31 which is made of transparent synthetic resin and which has lower and upper lids 31a and 31b. The lower lid 31a has a pair of pivots on its side surfaces and the upper lid 31b has a pair of holes corresponding to the pivots. The upper lid 31b is coupled to the lower lid 31a so as to turns on the pivots. A tray 32 is made of synthetic resin and is received in inside of the lower lid 31a. The tray 32 has four L-type projections 32a on its top surface to define a holding area for receiving a card-type object 33. The tray 32 further has a pair of supporting members 32b each of which has structure like a cantilever spring and which has claw 32c on its top.

When the card-type object 33 is pushed into the holding area, the supporting members 32b are elastically deformed and the claws 32c are forced apart to receive the card-type object 33. Once the card-type object 33 is received in the holding area, claws 32c returns to an initial state and holds the card-type object 33. Consequently, the claws 32c and the projections 32a restrict movement of the card-type object 33.

Though it seems easy to make the holding case 30 hold the card-type object 33, the holding case 30 misses holding the card-type object 33. Moreover, the holding case 30 has faults that it is difficult to release the card-type object 33 and that the supporting members 32b is easy to break. These faults are based on the structure of the supporting members 32b. Such as a holding case is disclosed in Utility Model Prepublication No. Hei 3-15393.

Figure 4:
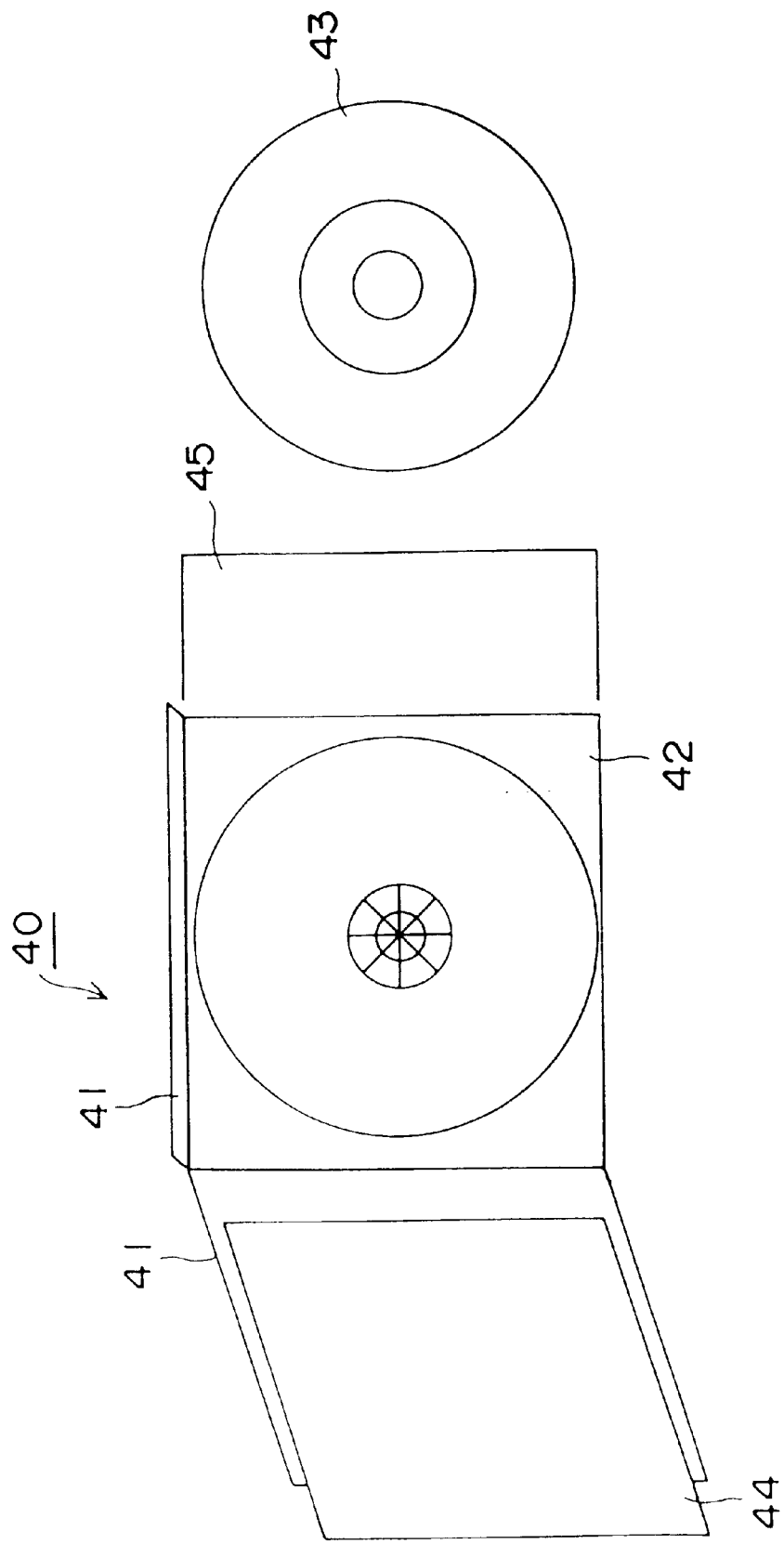
FIG. 4 shows a perspective view of further still another conventional holding case.

By the way, the holding case 30 looks like a CD (Compact Disk) or DVD (Digital Video or Versatile Disk) case based on universal standards standardized by ISO (International Organization for Standardization). As shown in FIG. 4, the CD (or DVD) case 40 comprises an external casing member 41 and an intermediate packing member 42 for a compact (or digital versatile) disk 43. The CD case 40 can receive not only the compact disk 43 but also an instruction manual 44 and a letter of guarantee 45. The CD case 40 is inexpensive because it is mass-produced. Moreover, various cabinets for receiving the CD case are produced.

Figure 5:
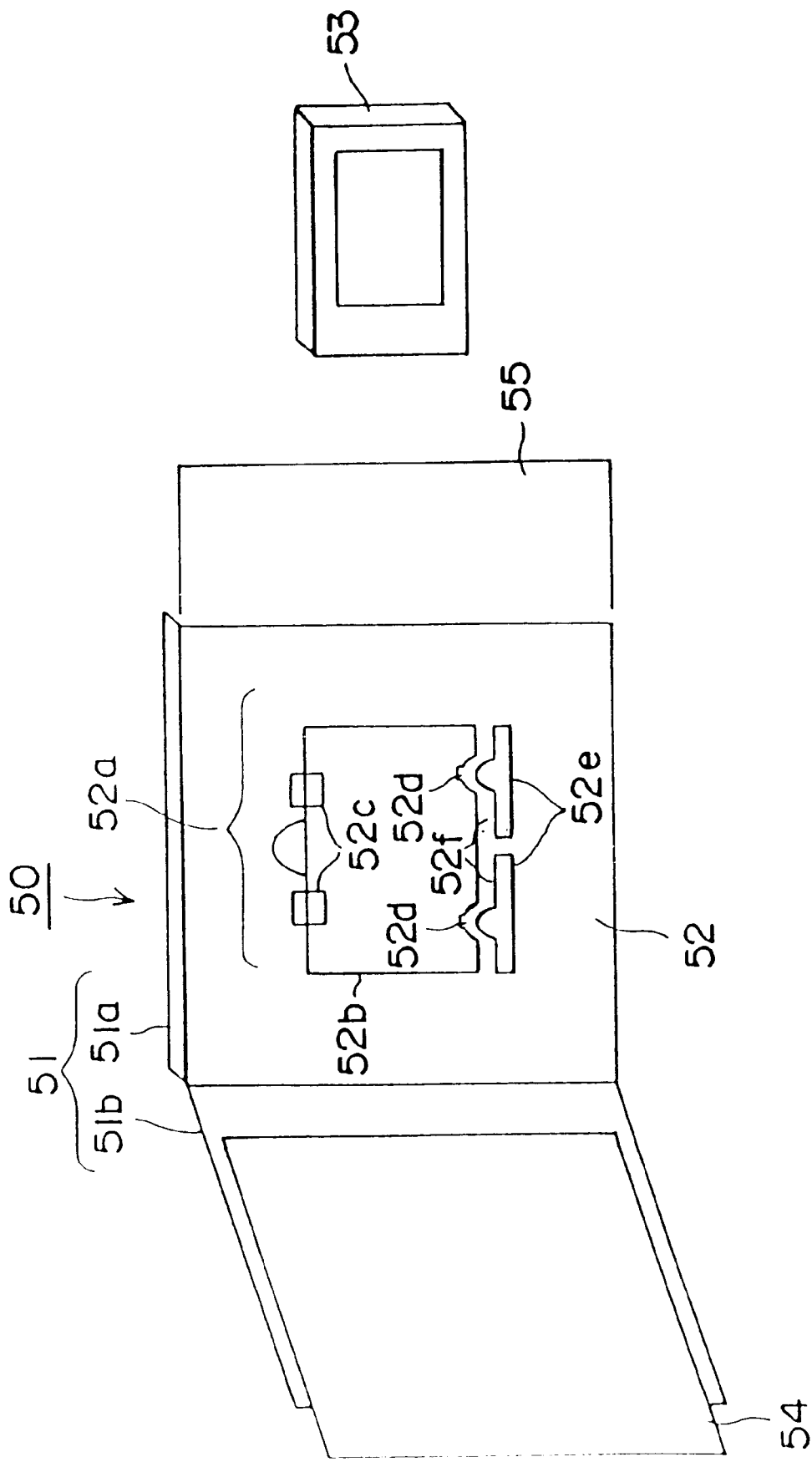
FIG. 5 shows a perspective view of a holding case according to a preferred embodiment of this invention and FIG. 6 is a further perspective view of the intermediate packing member of the case of FIG. 5.
Figure 6:
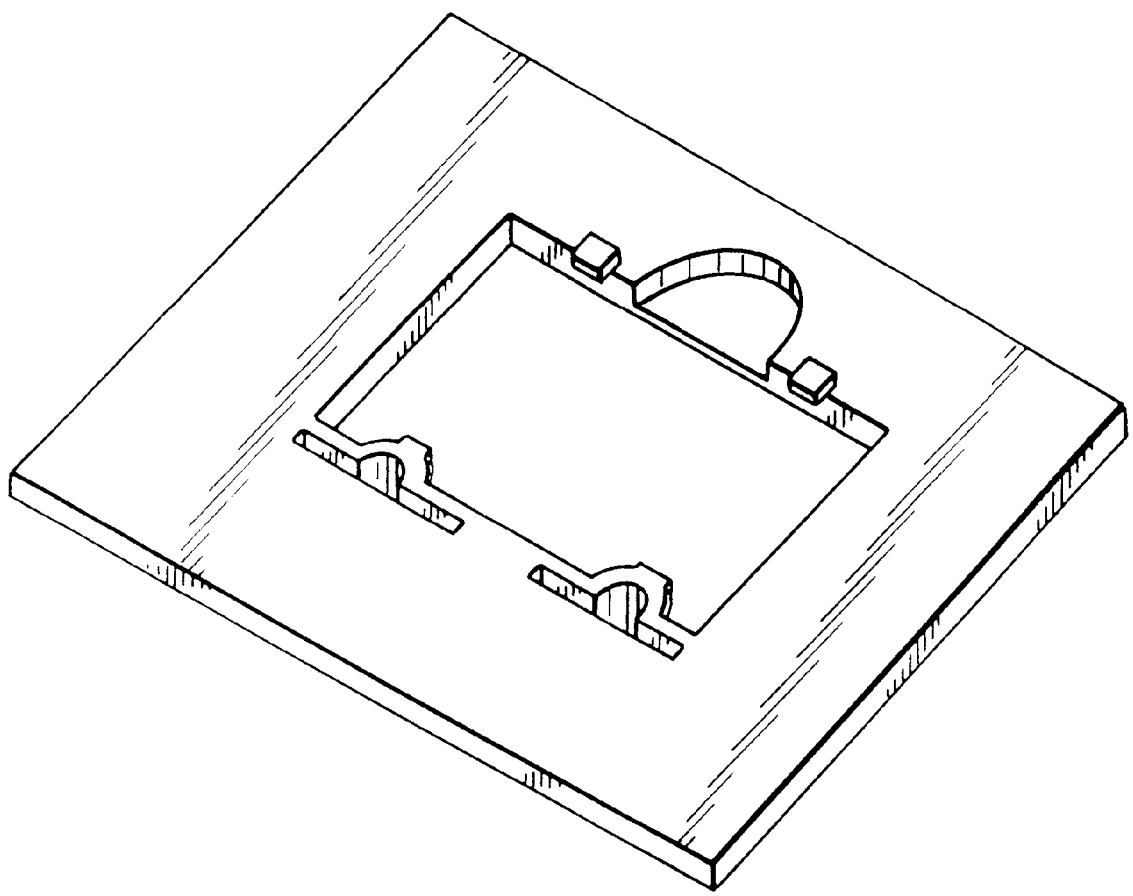

Referring to FIG. 5 and 6 the description will proceed to a holding case according to a preferred embodiment of this invention.

In FIG. 5 and 6 the holding case 50 comprises an external casing member 51 and an intermediate packing member 52 which is received by (or located in) the external casing member 51 and is for only a card-type object. The card-type object is, for example, an IC card 53 based on the PCMIA standards.

The external casing member 51 is identical with that of the CD or DVD case based on the universal standards. That is, the external casing member 51 has a main body 51a for receiving the intermediate packing member 52 and a lid 51b which is connected to the main body 51a. It is possible to open/close the external casing member 51 like a hinge. Both of the main body 51a and the lid 51b are made of plastic or synthetic resin and are transparent. When the holding case 50 is closed, it has a thin parallelepiped form.

The external casing member 51 can receive an instruction manual, a letter of guarantee, and so on. For example, the lid 51b receives the instruction manual 54. The lid 51b has claws (not shown) to hold the instruction manual 54. Moreover, the main body 51a receives the letter of guarantee 55 which is held by the intermediate packing member 52 received by the main body 51a.

The intermediate packing member 52 is made of plastic or synthetic resin and formed, for example, with molding. The intermediate packing member 52 has a shape that a gap remains between the intermediate packing member 52 and the main body 51a when the main body 51a receives the intermediate packing member 52. The gap is used for receiving the letter of guarantee 55, etc.

The intermediate packing member 52 has holding mechanism (or a clamper) 52a for holding the IC card 53. The holding mechanism 52a has a cavity or opening 52b which is slightly bigger than the IC card 53 and receives the IC card 53. Moreover, the holding mechanism 52a has a plurality of claws 52c and 52d to hold the IC card 53 received in the cavity 52b. The claws 52c and 52d project into the cavity 52b to prevent the IC card 53 from falling off the cavity 52b. The claws 52c and 52d hold the long sides of the IC card 53. In addition, the holding mechanism 52a has slits 52e beside bases of the claws 52d. The slits 52e are formed along the cavity 52b in the intermediate packing member 52. In other words, the holding mechanism 52a has elastic beams 52f that the claws 52d are formed on. The beams 52f are bent by external force supplied from the outside and the claws 52d are withdrawn from the cavity 52b. The Projecting degree of the claws 52d change in response to the external force. That is, the slits 52e make easy and reliable to hold/release the IC card 53.

As mentioned above, the external casing member 51 is diverted from the CD or DVD case. Because the CD case is made by mass production method, the external casing member 51 can be obtained for a low price. Hence, the holding case 50 is inexpensive.

Moreover, since the holding case 50 has a moderate size which is bigger than that of the IC card, it can hold the instruction manual 54, the letter of guarantee 55.

Furthermore, because thickness of the holding case 50 is relatively this is easy to handle.

In addition, the holding case 50 can certainly hold the IC card 53 because it has claws 52c and 52d for holding of the IC card 53. Moreover, the IC card 53 can be held/release to/from the holding case 50, because the slits 52e formed in the intermediate packing member 52 change the projecting degree of the claws 52d.

Therefore, the holding case having high reliability and durability.

The holding case can be stored in any of the cabinets for the CD or DVD case.

While this invention has thus far been described in conjunction with the preferred embodiment thereof, it will readily be possible for those skilled in the art to put this invention into practice in various other manners. For example, the shape of the cavity 52b, shape and the number of the claws 52c and 52d, shape and size of the slits 52e may be changed according to shape and size of a object which will be held by the holding case.

What is claimed is:

1. A holding case used for holding a card-type object, said holding case comprising;

an external casing member standardized for a CD case, and an intermediate packing member received by said external casing member and having a holding mechanism having a cavity for receiving said card-type object wherein said holding mechanism comprises;

a border region, at least a first and a second claw attached to said border region and projecting into said cavity to hold said card-type object received by said cavity, and a beam formed by forming a slit entirely within said border region and adjacent a base of said second claw to change a projecting degree of said second claw into said cavity.

2. A holding case as claimed in claim 1, wherein said cavity has a configuration to receive said card-type object in the form of an IC card base on a PCMCIA standards.

3. A holding case as claimed in claim 1, wherein said beam bends away from said cavity in response to an external force supplied from inserting said card-type object inside said cavity.

4. A holding case as claimed in claimed 1 wherein said cavity, has a pair of long sides parallel to each other, wherein said first claw projects into one of the long sides, and said second claw projects into the other long side.

5. A holding case as claimed in claim 1, wherein said holding mechanism further comprises first and a second additional claw each of which projects into said cavity for holding said card-type object together with said first and said second claws, and an additional beam formed by forming another slit adjacent a base of said second additional claw.

* * * * *

UNITED STATES PATENT AND TRADEMARK OFFICE
CERTIFICATE OF CORRECTION

PATENT NO. : 6,112,901
DATED : Setember 5, 2000
INVENTOR(S) : Takehiro NOGA, et al..

It is certified that error appears in the above-identified patent and that said Letters Patent is hereby corrected as shown below:

Please insert on the Front Cover of Patent:

Item [30] Foreign Application Priority Date change "June 30, 1999" to --June 30, 1998--.

Signed and Sealed this

First Day of May, 2001

*Attest:*

NICHOLAS P. GODICI

*Attesting Officer*       *Acting Director of the United States Patent and Trademark Office*